(12) United States Patent
Murakami

(10) Patent No.: US 11,629,773 B2
(45) Date of Patent: Apr. 18, 2023

(54) HYDRAULIC SHOCK ABSORBER

(71) Applicant: SHOWA CORPORATION, Gyoda (JP)

(72) Inventor: Yosuke Murakami, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 385 days.

(21) Appl. No.: 17/077,626

(22) Filed: Oct. 22, 2020

(65) Prior Publication Data

US 2021/0048084 A1 Feb. 18, 2021

Related U.S. Application Data

(63) Continuation of application No. PCT/JP2018/026679, filed on Jul. 17, 2018.

(51) Int. Cl.
*F16F 9/46* (2006.01)
*F16F 9/56* (2006.01)
(Continued)

(52) U.S. Cl.
CPC ............... *F16F 9/46* (2013.01); *B60G 15/12* (2013.01); *F16F 1/121* (2013.01); *F16F 9/56* (2013.01);
(Continued)

(58) Field of Classification Search
CPC ..... F16F 9/46; F16F 9/56; F16F 1/121; B60G 15/12; B60G 2202/314; B60G 17/044;
(Continued)

(56) References Cited

U.S. PATENT DOCUMENTS 4,491,207 A * 1/1985 Boonchanta ........... B60G 17/08
188/266.5
4,830,395 A * 5/1989 Foley ................. B60G 17/0272
280/124.162
(Continued)

FOREIGN PATENT DOCUMENTS

DE 19916366 A1 10/2000
JP 59-031507 U 2/1984
(Continued)

OTHER PUBLICATIONS

German Office Action dated Oct. 27, 2021 for the corresponding German Patent Application No. 112018007379.3.
(Continued)

*Primary Examiner* — Bradley T King
*Assistant Examiner* — James K Hsiao
(74) *Attorney, Agent, or Firm* — Leason Ellis LLP; Edward J. Ellis; Melvin C. Garner

(57) ABSTRACT

A hydraulic shock absorber includes a piston, a damper tube, a suspension spring, a plunger, a jack chamber, a pump case, a pump piston, a screw shaft, and a drive unit. Both end surfaces of the pump piston in a reciprocating direction are a first end surface demarcating the pump chamber, and a second end surface demarcating the gas chamber, the second end surface having a screw hole into which the screw shaft is screwed. The pump piston includes a space portion between a bottom plate defining the first end surface and the screw hole. The screw shaft has a through-hole connecting the gas chamber with the space portion.

18 Claims, 6 Drawing Sheets

(51) Int. Cl.
   *B60G 15/12* (2006.01)
   *B60G 17/02* (2006.01)
   *F16F 1/12* (2006.01)
   *B60G 17/027* (2006.01)
   *B60G 17/044* (2006.01)
   *B60G 15/06* (2006.01)

(52) U.S. Cl.
   CPC ............ *B60G 15/06* (2013.01); *B60G 17/027* (2013.01); *B60G 17/0272* (2013.01); *B60G 17/044* (2013.01); *B60G 2202/314* (2013.01); *B60G 2202/413* (2013.01); *B60G 2500/30* (2013.01)

(58) Field of Classification Search
   CPC .. B60G 15/06; B60G 2500/30; B60G 17/027; B60G 17/0272; B62K 2025/045
   See application file for complete search history.

(56) References Cited

U.S. PATENT DOCUMENTS

| | | | | |
|---|---|---|---|---|
| 5,348,112 | A * | 9/1994 | Vaillancourt | F16F 9/44 280/5.514 |
| 5,533,586 | A * | 7/1996 | Thompson | F16F 9/56 180/193 |
| 6,044,940 | A * | 4/2000 | Marzocchi | F16F 9/461 188/319.1 |
| 7,976,030 | B2 * | 7/2011 | Michel | B60G 17/021 267/221 |
| 8,047,340 | B2 * | 11/2011 | Abe | B60G 15/14 188/266.6 |
| 8,408,561 | B2 * | 4/2013 | Mochizuki | B60G 17/027 280/124.16 |
| 9,375,991 | B2 * | 6/2016 | Awasa | F16F 9/56 |
| 11,351,835 | B2 * | 6/2022 | Son | B60G 15/10 |
| 2007/0120302 | A1 * | 5/2007 | Abe | B60G 15/14 267/195 |
| 2009/0277736 | A1 * | 11/2009 | McAndrews | F16F 9/185 188/314 |
| 2010/0163357 | A1 * | 7/2010 | Hunter | F16F 9/56 188/319.2 |
| 2011/0101632 | A1 * | 5/2011 | Mochizuki | F16F 9/56 280/6.157 |
| 2012/0074660 | A1 * | 3/2012 | Thomas | B60G 17/021 280/5.514 |
| 2020/0070612 | A1 * | 3/2020 | Lee | B60G 11/14 |
| 2020/0130714 | A1 * | 4/2020 | Nies | F15B 15/16 |
| 2021/0048084 | A1 * | 2/2021 | Murakami | F16F 1/121 |
| 2021/0061043 | A1 * | 3/2021 | Yun | B60G 17/0565 |
| 2021/0061044 | A1 * | 3/2021 | Park | B60G 11/26 |

FOREIGN PATENT DOCUMENTS

| | | |
|---|---|---|
| JP | 2005-014887 A | 1/2005 |
| JP | 2005-121060 A | 5/2005 |
| JP | 2007-147016 A | 6/2007 |
| JP | 2007-253921 A | 10/2007 |
| JP | 2008-308029 A | 12/2008 |
| JP | 2014-148205 A | 8/2014 |

OTHER PUBLICATIONS

International Search Report dated Sep. 18, 2018 for the corresponding PCT International Application No. PCT/JP2018/026679.
Written Opinion dated Sep. 18, 2018 for the corresponding PCT International Application No. PCT/JP2018/026679.

* cited by examiner

HYDRAULIC SHOCK ABSORBER

CROSS-REFERENCE TO RELATED APPLICATION(S)

This application is a continuation of PCT application No. PCT/JP2018/026679, which was filed on Jul. 17, 2018, the content of which is incorporated herein by reference in its entirety.

FIELD OF THE INVENTION

The present invention relates to a hydraulic shock absorber particularly suitable for being employed in vehicles.

BACKGROUND OF THE INVENTION

Some of the hydraulic shock absorbers employed in vehicles are equipped with an adjustment device for adjusting the suspension spring in expansion and contraction directions with a hydraulic jack. The height of the vehicle can be adjusted by adjusting the suspension spring. The hydraulic shock absorber with such an adjustment device is disclosed in JP-A 2007-147016 (hereinafter, referred to as PTL 1), for example.

The hydraulic shock absorber disclosed in PTL 1 includes a plunger capable of adjusting the suspension spring in the expansion and contraction directions, and a jack chamber filled with oil that is capable of pushing the plunger in an advancing direction. The jack chamber is connected to a pump chamber. A screw shaft is screwed into a pump piston that is capable of being advanced and retracted in the pump chamber. The pump piston can be advanced and retracted by the screw shaft that is driven by a motor. As the pump piston is advanced and retracted, oil flows between the pump chamber and the jack chamber. As a result, the plunger is advanced and retracted to adjust the suspension spring in the expansion and contraction directions, that is, to adjust the height of the vehicle.

The hydraulic shock absorber disclosed in PTL 1 always receives a load corresponding to a mass of a vehicle body of a vehicle when assembled in the vehicle. That is, the hydraulic shock absorber continuously receives the potential energy due to gravity. Since the height of the vehicle is adjusted in this state, a huge load is applied to the motor.

In addition, the screw shaft is screwed into the pump piston to keep the height of the vehicle from being lowered by potential energy due to gravity. Since there is mechanical loss such as friction between the pump piston and the screw shaft, even when the vehicle height is lowered, the corresponding load is applied to the motor.

The hydraulic shock absorber disposed in a narrow space of the vehicle is preferably as small as possible. In order to decrease the size of the hydraulic shock absorber, it is conceivable to decrease the size of the motor (drive unit). For this purpose, it is required to reduce the load applied to the motor. However, if the adjustment device has a complicated structure in order to reduce the load, it is disadvantageous from the viewpoint of size and cost reduction of the hydraulic shock absorber.

An object of the present invention is to provide a hydraulic shock absorber capable of reducing the load applied to the drive unit of the adjustment device with a simple configuration.

SUMMARY OF INVENTION

According to the present invention, a hydraulic shock absorber includes:

a piston supported by a piston rod;
a damper tube housing the piston therein such that the piston is capable of being reciprocated;
a suspension spring biasing the damper tube and the piston rod in opposite directions;
a plunger capable of adjusting the suspension spring in expansion and contraction directions by being advanced and retracted in the expansion and contraction directions of the suspension spring;
a jack chamber holding the plunger such that the plunger is capable of being advanced and retracted, is the jack chamber being filled with oil capable of pushing the plunger in an advancing direction;
a pump case disposed to allow the oil to flow between the pump case and the jack chamber;
a pump piston partitioning an inside of the pump case into a pump chamber communicating with the jack chamber and a gas chamber filled with a pressurized gas, the pump piston being reciprocably housed in the pump case;
a screw shaft disposed in the gas chamber and screwed into the pump piston; and
a drive unit rotating the screw shaft.

A driving force for adjusting a hydraulic pressure by a drive unit can be assisted by a biasing force of a gas pressure. Accordingly, it is possible to reduce a load on the screw shaft that drives the pump piston forward and backward and the drive unit that rotates the screw shaft. That is, since the load applied to the screw shaft is reduced by the amount of assistance by the gas pressure, mechanical loss such as friction can be reduced. Further, the force to be generated by the drive unit can be reduced by the amount of the reduction of the mechanical loss and the amount of assistance by the gas pressure. As a result, the drive unit can be decreased in size. Further, for example, when the drive unit is electrically driven, power consumption can be reduced.

Furthermore, since the force for adjusting the hydraulic pressure by the drive unit is assisted by the biasing force of the gas pressure, the forward and backward speed of the plunger can be increased, and as a result, the vehicle height can be quickly adjusted.

According to the present invention, a simple configuration can be obtained, in which an inside of the pump case is partitioned by the pump piston into a pump chamber communicating with a jack chamber and a gas chamber filled with a pressurized gas. According to the present invention, it is possible to reduce the size of the drive unit while reducing the size and cost of the hydraulic shock absorber.

DETAILED DESCRIPTION OF THE INVENTION

Figure 1:
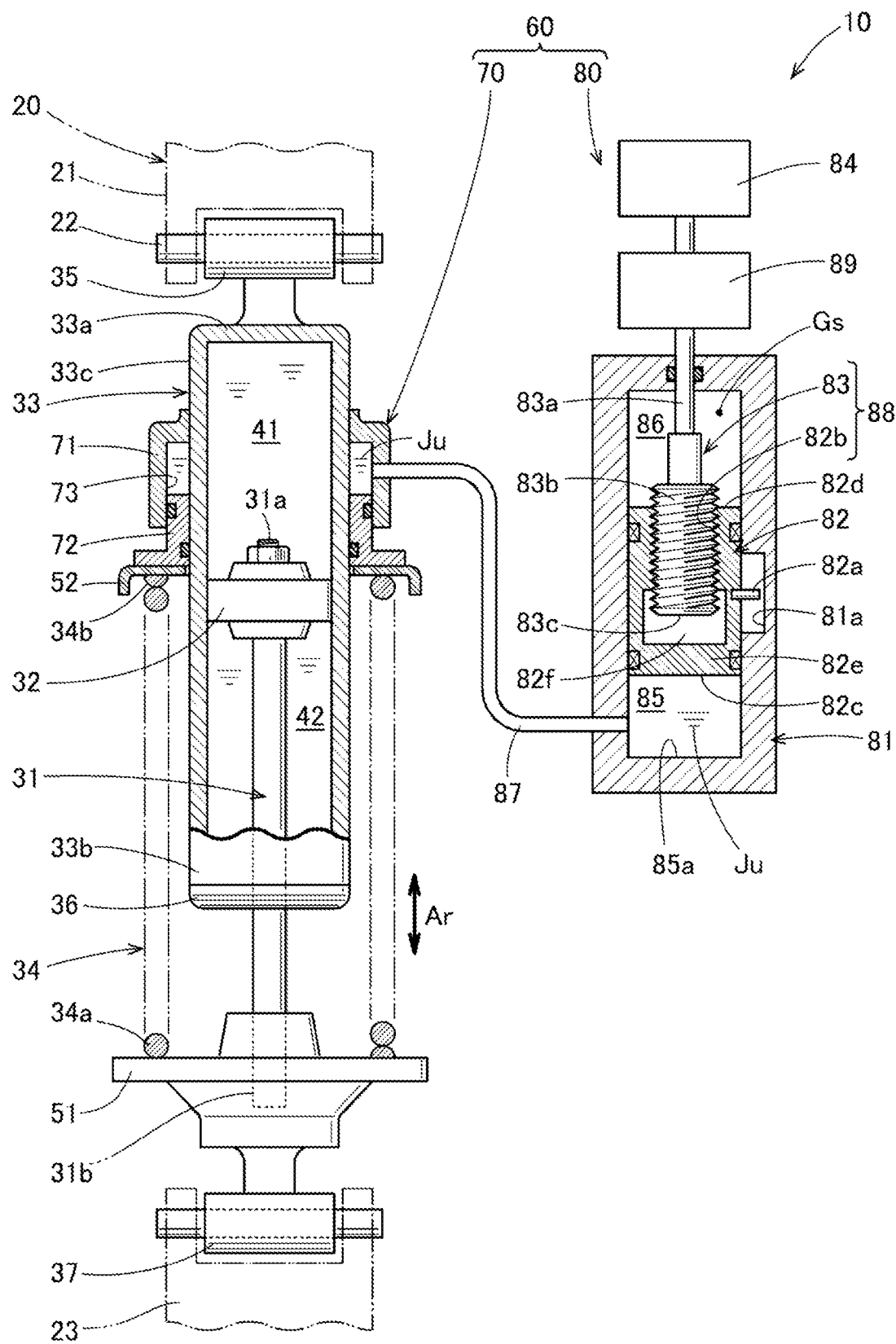
FIG. 1 is a diagram schematically illustrating a hydraulic shock absorber according to a first embodiment of the present invention.

Embodiments of the present invention will be described below with reference to the accompanying drawings.

First Embodiment

A hydraulic shock absorber 10 according to the first embodiment will be described with reference to FIGS. 1 and 2. The hydraulic shock absorber 10 is employed in a vehicle, for example, and as an example, is used as a rear cushion of a motorcycle 20 which is a kind of saddle-ride type vehicle on which a motorcyclist rides.

The hydraulic shock absorber 10 includes a piston rod 31, a piston 32 supported by one end 31a (first end 31a) of the piston rod 31, a damper tube 33 housing the piston 32 therein such that the piston 32 is capable of being reciprocated, and a suspension spring 34 for biasing the damper tube 33 and the piston rod 31 in opposite directions.

A first support portion 35 is provided on a closed end 33a (first end 33a) of the damper tube 33, that is, on a front end of the damper head 33a. The first support portion 35 is supported by a support shaft 22 with respect to a vehicle body 21 of the motorcycle 20. The other end 33b (second end 33b) of the damper tube 33 is closed by a lower cap 36. A second support portion 37 is provided on the other end 31b (second end 31b) side of the piston rod 31. The second support portion 37 is capable of supporting a rear wheel of the motorcycle 20 via a rear wheel support mechanism 23 such as a link mechanism or a swing arm, for example.

The inside of the damper tube 33 is partitioned by the piston 32 into an oil chamber 41 on the first end 33a side and an oil chamber 42 on the second end 33b side.

The suspension spring 34 is formed of a compression coil spring positioned so as to surround an outer peripheral surface 33c of the damper tube 33. Both ends 34a and 34b of the suspension spring 34 are supported by a retainer 51 provided at the second end 31b of the piston rod 31 and a spring seat 52. The spring seat 52 is provided between the suspension spring 34 and a plunger 72. However, the presence of the spring seat 52 is optional. When the spring seat 52 is not provided, the other end 34b of the suspension spring 34 is capable of being supported by the plunger 72. Hereinafter, one end 34a of the suspension spring 34 supported by the retainer 51 will be referred to as a "first end 34a", and the other end 34b that is capable of being supported by the plunger 72 will be referred to as a "second end 34b".

An adjustment device 60 is provided in the hydraulic shock absorber 10 in order to adjust the suspension spring 34 in expansion and contraction directions Ar. The adjustment device 60 includes a hydraulic jack unit 70 that adjusts the suspension spring 34 in the expansion and contraction directions Ar, and a hydraulic control unit 80 that controls the hydraulic pressure of the hydraulic jack unit 70.

The hydraulic jack unit 70 includes a jack housing 71 and the plunger 72, which are located on the side opposite to the retainer 51 with respect to the suspension spring 34.

The jack housing 71 is a cylindrical member that surrounds the outer peripheral surface 33c of the damper tube 33, and is open only on the side on which the suspension spring 34 is disposed. A gap between the outer peripheral surface 33c of the damper tube 33 and the jack housing 71 is sealed. An inside 73 of the jack housing 71 is referred to as a "jack chamber 73".

The jack chamber 73 holds the plunger 72 such that the plunger 72 is capable of being advanced and retracted. The plunger 72 is an annular member fitted on the outer peripheral surface 33c of the damper tube 33 so as to be capable of being advanced and retracted, and is possible to be advanced and retracted in the expansion and contraction directions Ar of the suspension spring 34 to adjust the suspension spring 34 in the expansion and contraction directions Ar. The jack chamber 73 is filled with oil Ju capable of pushing the plunger 72 in the advancing direction. A gap between the inner peripheral surface of the jack housing 71 and the plunger 72, and a gap between the outer peripheral surface 33c of the damper tube 33 and the plunger 72 are sealed, so that the jack chamber 73 is sealed. The plunger 72 pushes the second end 34b of the suspension spring 34 directly, or via the spring seat 52.

The hydraulic control unit 80 is incorporated in the hydraulic shock absorber 10. The hydraulic control unit 80 includes a pump case 81, a pump piston 82, a screw shaft 83, and a drive unit 84.

The pump case 81 is disposed such that the oil Ju is allowed to flow (communicate) between the pump case 81 and the jack chamber 73. The pump case 81 may be configured integrally with the jack housing 71.

The pump piston 82 is reciprocably housed in the pump case 81 with its relative rotation restricted. For example, a guide groove 81a extending in the reciprocating direction of the pump piston 82 is formed on an inner surface of the pump case 81. A bar 82a fitted into the guide groove 81a is provided on an outer peripheral surface of the pump piston 82. The bar 82a is guided by the guide groove 81a. As a result, the pump piston 82 is possible to be reciprocated with respect to the pump case 81 and restricted from relatively rotating.

The inside of the pump case 81 is partitioned by the pump piston 82 into a pump chamber 85 communicating with the jack chamber 73 and a gas chamber 86 filled with a pressurized gas Gs such as pressurized air. The pressure of the pressurized gas Gs filling the gas chamber 86 is set to an appropriate value in advance.

The jack chamber 73 and the pump chamber 85 are communicated by a communication passage 87. In addition to the illustrated form, the communication passage 87 is capable of being formed in the jack housing 71 and the pump case 81. The communication passage 87 is formed of a hose, for example.

The screw shaft 83 (driving shaft 83) is disposed in the gas chamber 86 and is screwed into the pump piston 82 in such a form that the screw shaft 83 is rotatable with respect to the pump case 81 while being restricted from moving in the axial direction thereof. The screw shaft 83 includes a shaft portion 83a extending in the reciprocating direction of the pump piston 82, and a male screw 83b formed on the shaft portion 83a. The male screw 83b is located coaxially with the screw shaft 83 and is capable of being screwed into a screw hole 82b (female screw 82b) formed in the pump piston 82. A screw mechanism 88 is formed by the screw hole 82b and the screw shaft 83.

The drive unit 84 is provided to rotate the screw shaft 83 and configured as an electric motor, for example. The power of the electric motor 84 (drive unit 84) is transferred to the shaft portion 83a of the screw shaft 83 by a transfer mechanism 89.

As described above, the drive unit 84 is the electric motor 84. Therefore, the suspension spring 34 is capable of being adjusted in the expansion and contraction directions Ar by the small electric motor 84.

When the screw shaft 83 is rotated forward and backward by driving of the electric motor 84, the pump piston 82 screwed into the screw shaft 83 is advanced and retracted. Accordingly, the pressure of the oil Ju filling the pump chamber 85 and the jack chamber 73 changes. When the hydraulic pressure in the pump chamber 85 is increased, the suspension spring 34 is contracted as the plunger 72 is advanced. When the hydraulic pressure in the pump chamber 85 is reduced, the suspension spring 34 is extended as the plunger 72 is retracted.

The driving force for adjusting the hydraulic pressure by the drive unit 84 is assisted by the biasing force of the gas pressure of the pressurized gas Gs filling the gas chamber 86. The first end surface 82c of the pump piston 82 partitions the pump chamber 85, and the second end surface 82d partitions the gas chamber 86. As illustrated in FIG. 2, an area A2 of the second end surface 82d is smaller than an area A1 of the first end surface 82c by an opening area A3 of the screw hole 82b.

The pump piston 82 and the screw shaft 83 are restricted from being separated from each other. For example, the pump piston 82 includes a bottom plate 82e for defining the first end surface 82c. The screw hole 82b does not pass through the bottom plate 82e. That is, the pump piston 82 has a space portion 82f between the screw hole 82b and the bottom plate 82e. When the pump piston 82 moves toward the pump chamber 85, the first end surface 82c comes into contact with the bottom surface 85a of the pump chamber 85, so that the pump piston 82 is kept from being moved further to the pump chamber 85 side. The screw hole 82b is set to a length such that it is not separated from the male screw 83b even when the first end surface 82c comes into contact with the bottom surface 85a.

In this way, the pump piston 82 and the screw shaft 83 are restricted from being separated from each other. Therefore, even when the biasing force of the gas pressure is greater than the biasing force of the hydraulic pressure, it is not the pump piston 82 alone that is advanced due to the gas pressure. Therefore, it is possible to further enhance the biasing effect (assistance effect) by the gas pressure.

The above description is summarized as follows.

Figure 2:
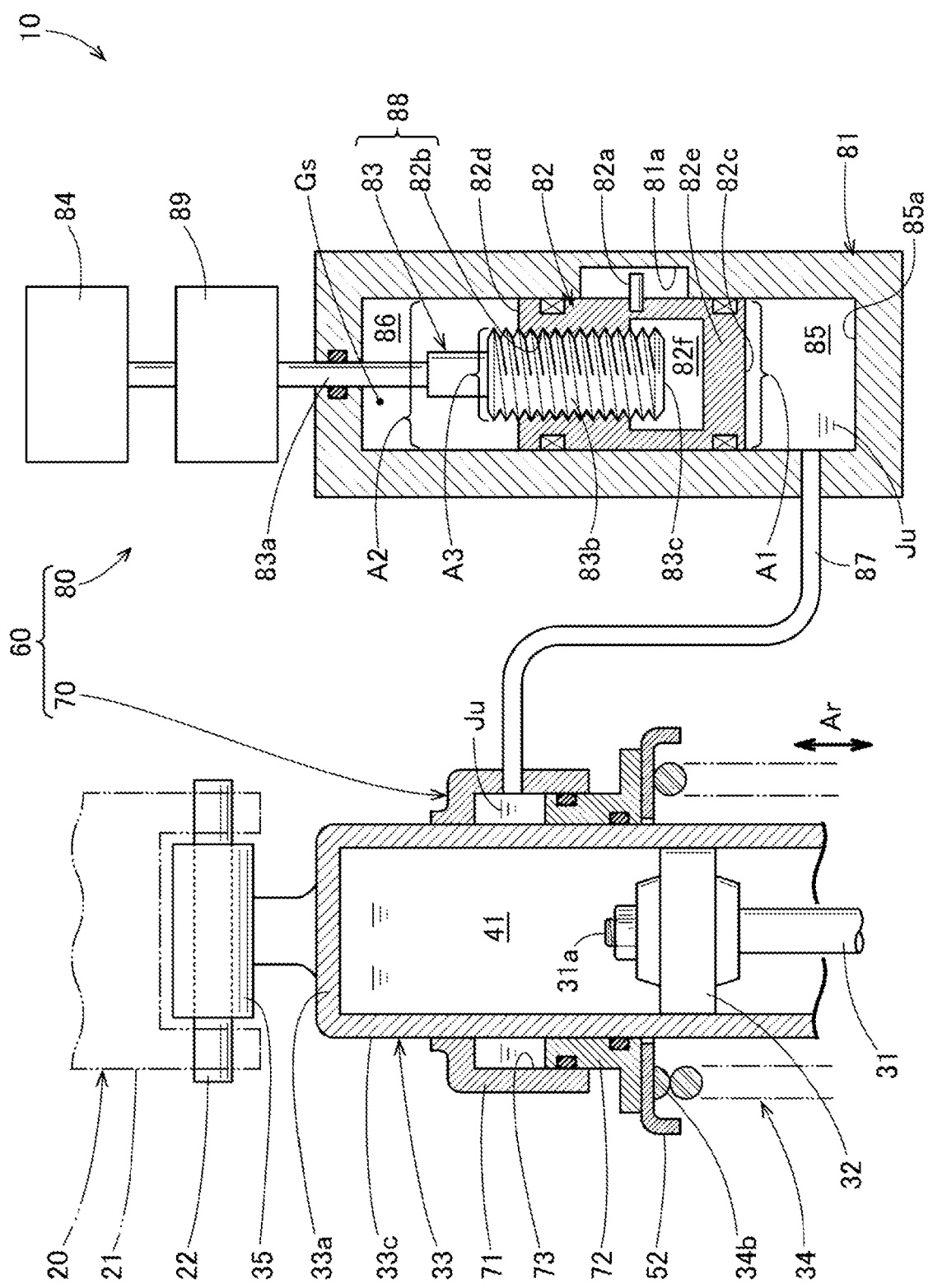
FIG. 2 is an enlarged view of a periphery of the hydraulic jack unit illustrated in FIG. 1.

As illustrated in FIGS. 1 and 2, the hydraulic shock absorber 10 of the present invention includes, the piston 32 supported by the piston rod 31, the damper tube 33 housing the piston 32 therein such that the piston 32 is capable of being reciprocated, the suspension spring 34 biasing the damper tube 33 and the piston rod 31 in opposite directions, the plunger 72 capable of adjusting the suspension spring 34 in the expansion and contraction directions Ar by being advanced and retracted in the expansion and contraction directions Ar of the suspension spring 34, the jack chamber 73 holding the plunger 72 such that the plunger 72 is capable of being advanced and retracted, the jack chamber 72 being filled with the oil Ju capable of pushing the plunger 72 in the advancing direction, the pump case 81 disposed to allow the oil Ju to flow between the pump case 81 and the jack chamber 73, the pump piston 82 partitioning the inside of the pump case 81 into the pump chamber 85 communicating with the jack chamber 73 and the gas chamber 86 filled with the pressurized gas Gs, the pump piston 82 being reciprocably housed in the pump case 81, the screw shaft 83 disposed in the gas chamber 86 and screwed into the pump piston 82, and the drive unit 84 rotating the screw shaft 83.

Thus, it is possible to assist the driving force for adjusting the hydraulic pressure using the drive unit 84 by the biasing force of the gas pressure. Accordingly, it is possible to reduce the load on the screw shaft 83 that drives the pump piston 82 forward and backward and the drive unit 84 that rotates the screw shaft 83. That is, since the load applied to the screw shaft 83 is reduced by the amount of assistance by the gas pressure, mechanical loss such as friction can be reduced. Further, it is possible to reduce the force to be generated using the drive unit 84 by the amount of the reduction of the mechanical loss and the amount of assistance by the gas pressure. As a result, it is possible to decrease the drive unit 84 in size. Further, for example, when the drive unit 84 is electrically driven, it is possible to reduce power consumption.

Furthermore, since the driving force for adjusting the hydraulic pressure by the drive unit 84 is assisted by the biasing force of the gas pressure, it is possible to increase the forward and backward speed of the plunger 72, and as a result, it is possible to quickly adjust the vehicle height.

Moreover, a simple configuration is achieved only by partitioning the inside of the pump case 81 by the pump piston 82 into the pump chamber 85 communicating with the jack chamber 73 and the gas chamber 86 filled with the pressurized gas Gs. As a result, according to the present invention, it is possible to reduce the size of the drive unit 84 while reducing the size and cost of the hydraulic shock absorber 10.

Furthermore, the both end surfaces 82c and 82d of the pump piston 82 in the reciprocating direction are the first end surface 82c partitioning the pump chamber 85, and the second end surface 82d partitioning the gas chamber 86, the second end surface having the screw hole 82b into which the screw shaft 83 is screwed, and the area A2 of the second end surface 82d is smaller than the area A1 of the first end surface 82c by the opening area A3 of the screw hole 82b.

Even in such a configuration, it is possible to reduce the load on the drive unit 84 for adjusting the hydraulic pressure by the gas pressure while the screw mechanism 88 including the screw shaft 83 and the screw hole 82b is maintained in the simple configuration.

Next, some embodiments in which the configuration of the hydraulic control unit 80 is changed will be described. Since the basic configuration of the hydraulic shock absorber 10 and the hydraulic jack unit 70 according to the first embodiment described above did not change, the description thereof will be omitted. The same components as those in the first embodiment described above are denoted by the same reference numerals, and the description thereof will be omitted.

Second Embodiment

Figure 3:
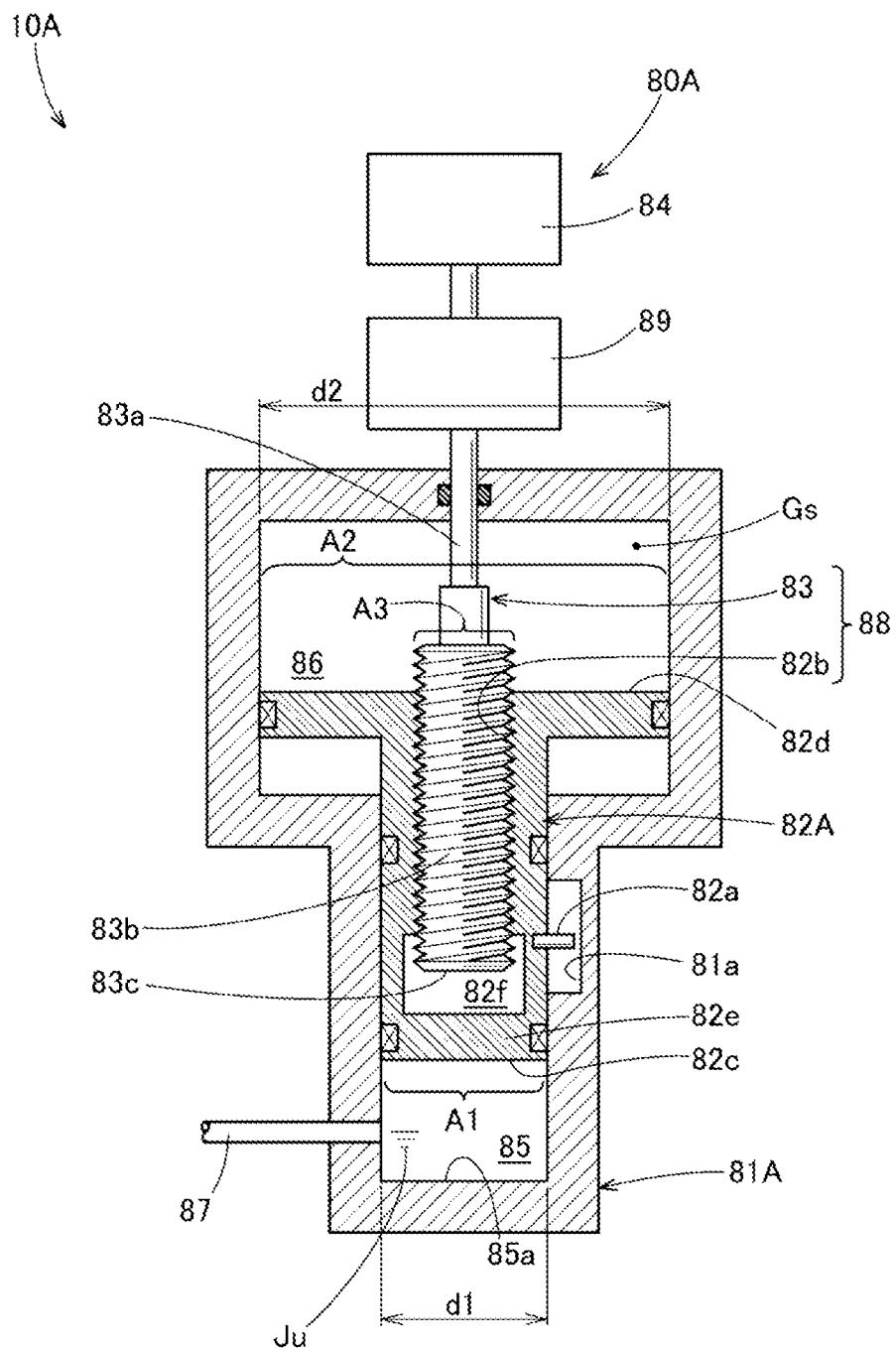
FIG. 3 is a schematic diagram illustrating a periphery of a hydraulic control unit of a hydraulic shock absorber according to a second embodiment of the present invention.

A hydraulic control unit 80A of a hydraulic shock absorber 10A according to the second embodiment will be described with reference to FIG. 3. FIG. 3 illustrates an illustration corresponding to the hydraulic control unit 80 illustrated in FIG. 2. The hydraulic control unit 80A according to the second embodiment is characterized in that the pump case 81 and the pump piston 82 of the first embodiment illustrated in FIG. 2 are changed to a pump case 81A and a pump piston 82A illustrated in FIG. 3, while the other configurations are the same as those of the hydraulic control unit 80 of the first embodiment.

Specifically, the pump piston 82A is characterized in that the area A2 of the second end surface 82d is greater than the area A1 of the first end surface 82c. Further, more specifically, the area obtained by subtracting the opening area A3 of the screw hole 82b from the area A2 of the second end surface 82d is greater than the area A1 of the first end surface 82c ((A2−A3)>A1). Specifically, a diameter d2 of the second end surface 82d and the gas chamber 86 is greater than a diameter d1 of the first end surface 82c and the pump chamber 85.

As described above, in the hydraulic shock absorber 10A according to the second embodiment, the both end surfaces 82c and 82d of the pump piston 82A in the reciprocating direction are a first end surface 82c partitioning the pump chamber 85, and a second end surface 82d partitioning the gas chamber 86 the second end surface 82d having a screw hole 82b into which the screw shaft 83 is screwed, and the diameter d2 of the second end surface 82d is greater than the diameter d1 of the first end surface 82c so that the area A2 of the second end surface 82d is greater than the area A1 of the first end surface 82c.

With such a configuration, even when the gas pressure stored in the gas chamber 86 of the hydraulic shock absorber 10A according to the second embodiment is lower than the gas pressure stored in the gas chamber 86 of the hydraulic shock absorber 10 according to the first embodiment, it is possible to reduce the load on the drive unit 84 to the same extent as in the first embodiment.

Third Embodiment

Figure 4:
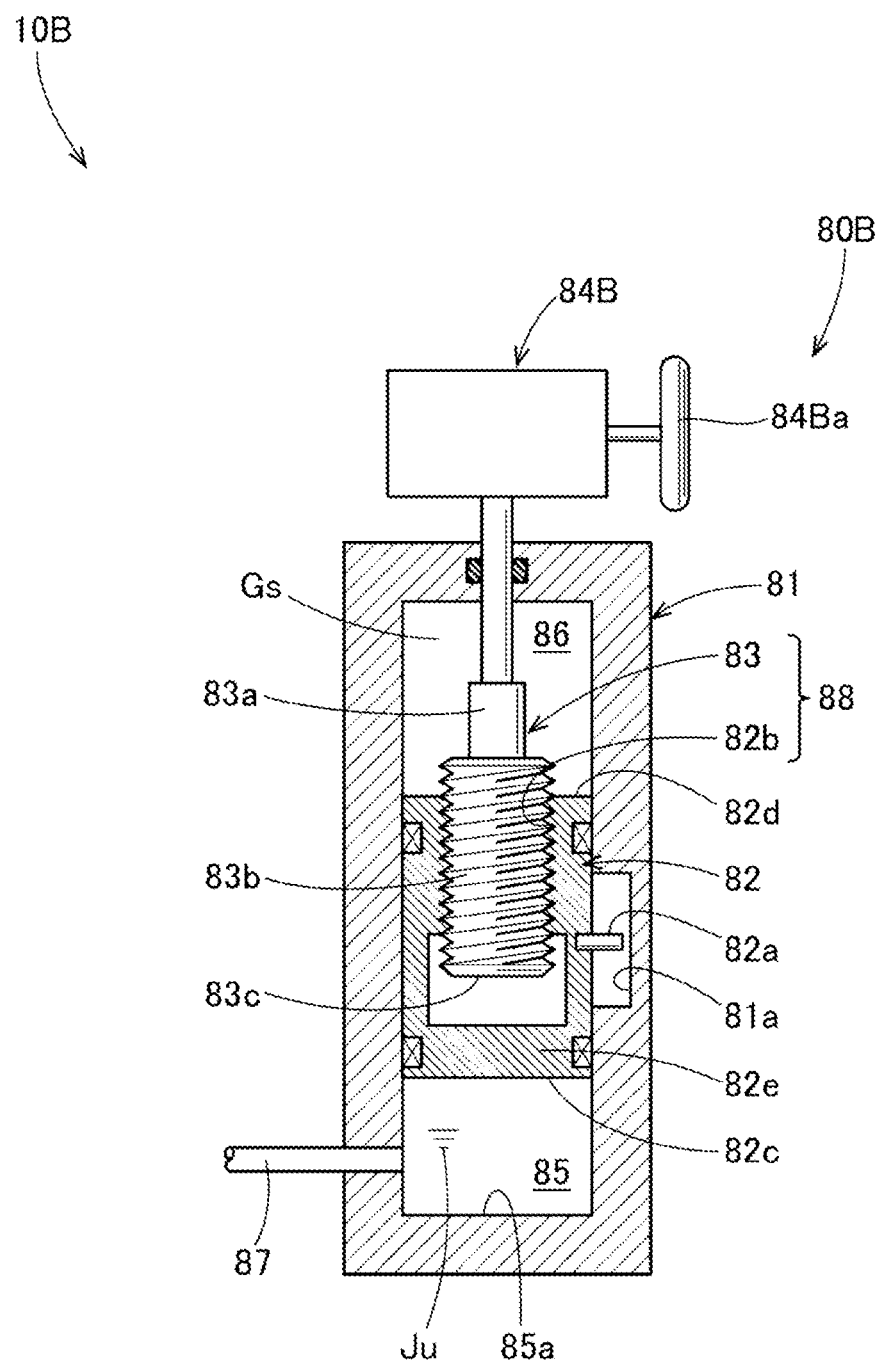
FIG. 4 is a schematic diagram illustrating a periphery of a hydraulic control unit of a hydraulic shock absorber according to a third embodiment of the present invention.

A hydraulic control unit 80B of a hydraulic shock absorber 10B according to the third embodiment will be described with reference to FIG. 4. FIG. 4 illustrates an illustration corresponding to the hydraulic control unit 80 illustrated in FIG. 2. The hydraulic control unit 80B of the third embodiment is characterized in that the drive unit 84 of the first embodiment illustrated in FIG. 2 is changed to a drive unit 84B illustrated in FIG. 4, while the other configurations are the same as those of the drive unit 84 of the first embodiment.

The drive unit 84B is an operation mechanism capable of being manually operated. Thus, it is possible to adjust the suspension spring 34 (see FIG. 1) by a slight operating force of an operator. Specifically, the drive unit 84B includes an operation handle 84Ba for the operator to operate. When the operator turns the operation handle 84Ba, the drive unit 84B turns the screw shaft 83. As a result, the pump piston 82 is capable of being advanced and retracted to adjust the pressure of the oil Ju in the pump chamber 85.

Fourth Embodiment

Figure 5:
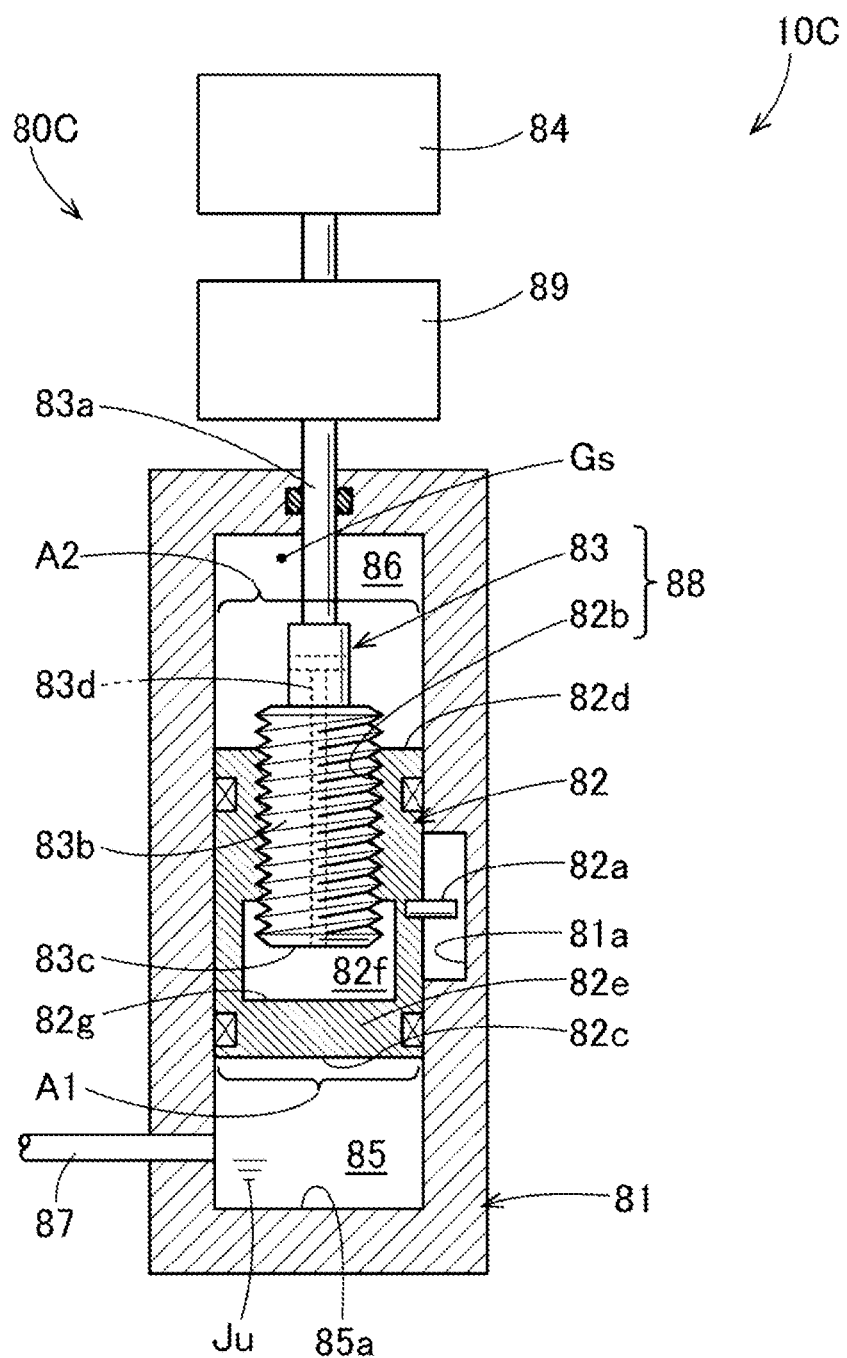
FIG. 5 is a schematic diagram illustrating a periphery of a hydraulic control unit of a hydraulic shock absorber according to a fourth embodiment of the present invention.

A hydraulic control unit 80C of a hydraulic shock absorber 10C according to the fourth embodiment will be described with reference to FIG. 5. FIG. 5 illustrates an illustration corresponding to the hydraulic control unit 80 illustrated in FIG. 2. The hydraulic control unit 80C according to the fourth embodiment is characterized in that the screw shaft 83 according to the first embodiment illustrated in FIG. 2 has a through-hole 83d, while the other configurations are the same as those of the hydraulic control unit 80 according to the first embodiment.

Specifically, the through-hole 83d of the screw shaft 83 connects the space portion 82f of the pump piston 82 with the gas chamber 86. Therefore, the space portion 82f is filled with the pressurized gas Gs. The pressure in the space portion 82f is the same as the pressure in the gas chamber 86. Both surfaces 82c and 82g of the bottom plate 82e of the pump piston 82 are a first end surface 82c demarcating the pump chamber 85 and an inner surface 82g forming the space portion 82f. The biasing force of the gas pressure is applied from the inner surface 82g forming the space portion 82f toward the pump chamber 85 side. Therefore, although the area A2 of the second end surface 82d is reduced by the area of the opening of the screw hole 82b provided in the second end surface 82d of the pump piston 82, it is possible to compensate the reduced area by the area of the inner surface 82g. Thus, the total area of the area A2 of the second end surface 82d and the area of the inner surface 82g is possible to be at least equal to the area A1 of the first end surface 82c. With such a configuration, even when the gas pressure stored in the gas chamber 86 of the hydraulic shock absorber 10C according to the fourth embodiment is lower than the gas pressure stored in the gas chamber 86 of the hydraulic shock absorber 10 according to the first embodiment, it is possible to reduce the load on the drive unit 84 to the same extent as in the first embodiment.

Fifth Embodiment

Figure 6:
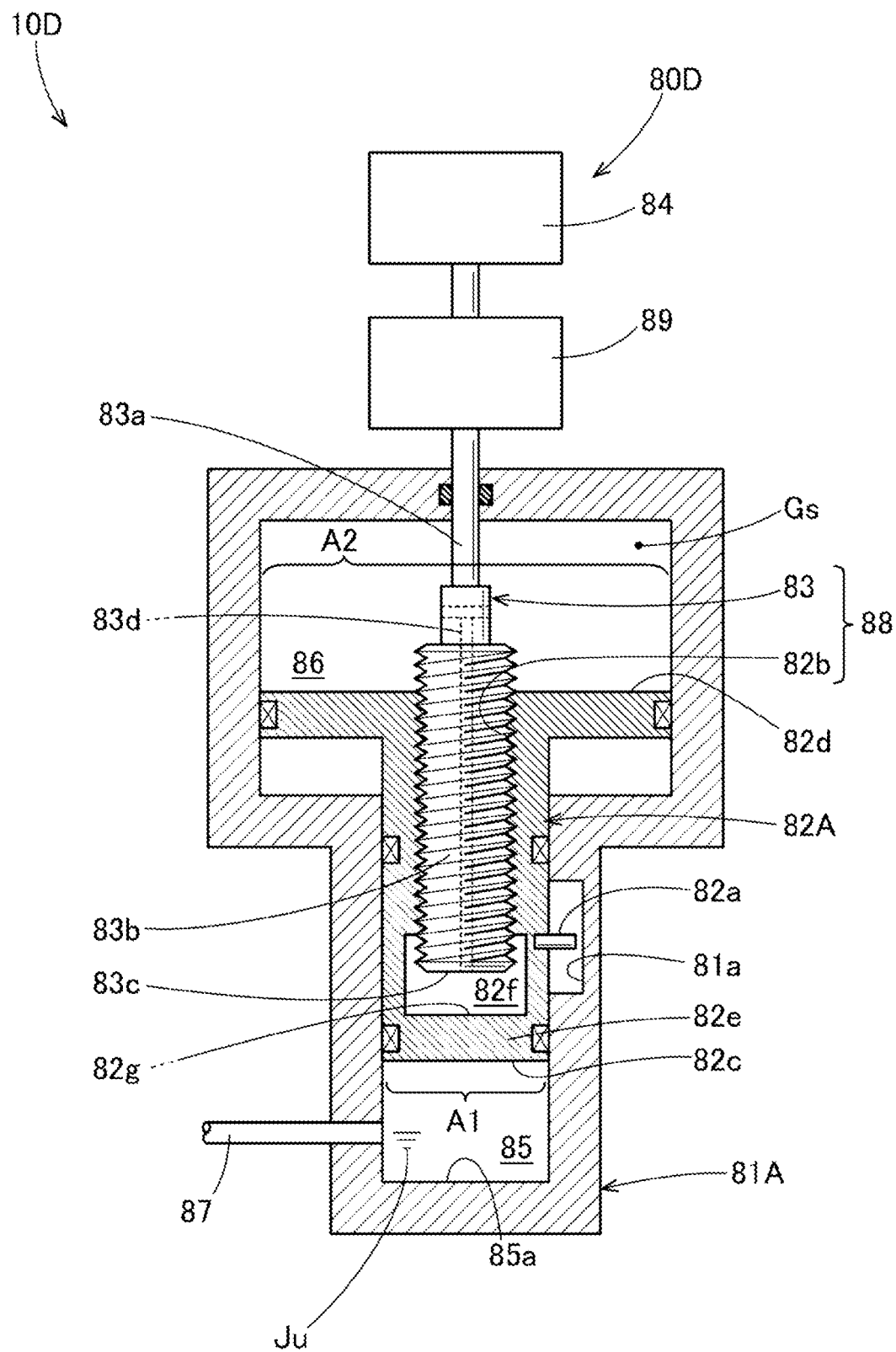
FIG. 6 is a schematic diagram illustrating a periphery of a hydraulic control unit of a hydraulic shock absorber according to a fifth embodiment of the present invention.

A hydraulic control unit 80D of a hydraulic shock absorber 10D according to the fifth embodiment will be described with reference to FIG. 6. FIG. 6 illustrates an illustration corresponding to the hydraulic control unit 80A illustrated in FIG. 3. The hydraulic control unit 80D according to the fifth embodiment is characterized in that the screw shaft 83 according to the second embodiment illustrated in FIG. 3 has a through-hole 83d, while the other configurations are the same as those of the hydraulic control unit 80A according to the second embodiment.

Specifically, the through-hole 83d of the screw shaft 83 connects the space portion 82f of the pump piston 82 with the gas chamber 86. Accordingly, the pressure in the space portion 82f is the same as the pressure in the gas chamber 86. The biasing force of the gas pressure is applied from the inner surface 82g forming the space portion 82f toward the pump chamber 85 side. With such a configuration, it is possible to receive the gas pressure for reducing the load on the drive unit 84 by the area A2 of the second end surface 82d and the area of the inner surface 82g. As a result, even when the gas pressure stored in the gas chamber 86 of the hydraulic shock absorber 10D according to the fifth embodiment is lower than the gas pressure stored in the gas chamber 86 of the hydraulic shock absorber 10 according to the first embodiment, it is possible to reduce the load on the drive unit 84 to the same extent as in the first embodiment.

The hydraulic shock absorbers 10 and 10A to 10D according to the present invention are not limited to the embodiments as long as the actions and effects of the present invention are exhibited.

The hydraulic shock absorbers 10 and 10A to 10D according to the present invention are suitable for being employed as a rear cushion of a saddle-ride type vehicle.

What is claimed is:
1. A hydraulic shock absorber, comprising:
a piston supported by a piston rod;
a damper tube housing the piston therein such that the piston is capable of being reciprocated;

a suspension spring biasing the damper tube and the piston rod in opposite directions;

a plunger capable of adjusting the suspension spring in expansion and contraction directions by being advanced and retracted in the expansion and contraction directions of the suspension spring;

a jack chamber holding the plunger such that the plunger is capable of being advanced and retracted, the jack chamber being filled with oil capable of pushing the plunger in an advancing direction;

a pump case disposed to allow the oil to flow between the pump case and the jack chamber;

a pump piston partitioning an inside of the pump case into a pump chamber communicating with the jack chamber and a gas chamber filled with a pressurized gas, the pump piston being reciprocably housed in the pump case;

a screw shaft disposed in the gas chamber and screwed into the pump piston; and a drive unit rotating the screw shaft, wherein both end surfaces of the pump piston in a reciprocating direction are a first end surface demarcating the pump chamber, and a second end surface demarcating the gas chamber, the second end surface having a screw hole into which the screw shaft is screwed, the pump piston includes a space portion between a bottom plate defining the first end surface and the screw hole, and the screw shaft has a through-hole connecting the gas chamber with the space portion.

2. The hydraulic shock absorber according to claim 1, wherein an area of the second end surface is smaller than an area of the first end surface by an opening area of the screw hole.

3. The hydraulic shock absorber according to claim 2, wherein the pump piston and the screw shaft are restricted from being separated from each other.

4. The hydraulic shock absorber according to claim 3, wherein the drive unit is an electric motor.

5. The hydraulic shock absorber according to claim 3, wherein the drive unit is an operation mechanism capable of being manually operated.

6. The hydraulic shock absorber according to claim 2, wherein the drive unit is an electric motor.

7. The hydraulic shock absorber according to claim 2, wherein the drive unit is an operation mechanism capable of being manually operated.

8. The hydraulic shock absorber according to claim 1, wherein a diameter of the second end surface is greater than a diameter of the first end surface so that an area of the second end surface is greater than an area of the first end surface.

9. The hydraulic shock absorber according to claim 8, wherein the pump piston and the screw shaft are restricted from being separated from each other.

10. The hydraulic shock absorber according to claim 9, wherein the drive unit is an electric motor.

11. The hydraulic shock absorber according to claim 9, wherein the drive unit is an operation mechanism capable of being manually operated.

12. The hydraulic shock absorber according to claim 8, wherein the drive unit is an electric motor.

13. The hydraulic shock absorber according to claim 8, wherein the drive unit is an operation mechanism capable of being manually operated.

14. The hydraulic shock absorber according to claim 1, wherein the pump piston and the screw shaft are restricted from being separated from each other.

15. The hydraulic shock absorber according to claim 14, wherein the drive unit is an electric motor.

16. The hydraulic shock absorber according to claim 14, wherein the drive unit is an operation mechanism capable of being manually operated.

17. The hydraulic shock absorber according to claim 1, wherein the drive unit is an electric motor.

18. The hydraulic shock absorber according to claim 1, wherein the drive unit is an operation mechanism capable of being manually operated.

* * * * *